(12) United States Patent
Shoaf et al.

(10) Patent No.: US 6,471,071 B1
(45) Date of Patent: Oct. 29, 2002

(54) UNIVERSAL GROMMET SEAL FOR SPIN-ON TYPE FILTERS

(75) Inventors: Megan E. Shoaf, Perrysburg, OH (US); Richard J. Berkey, Perrysburg, OH (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/566,749

(22) Filed: May 9, 2000

(51) Int. Cl.⁷ .............................................. B01D 27/08
(52) U.S. Cl. ...................... 210/440; 210/442; 210/444; 210/450; 210/457; 210/DIG. 13; 210/DIG. 17; 277/918
(58) Field of Search ........................ 210/438, DIG. 17, 210/437, 440, 442–444, 446–448, 453, 455, 457, 433.1, 450; 277/594, 596, 605, 634, 635–636, 935, 944, 630, 626, 641, 644, 647

(56) References Cited

U.S. PATENT DOCUMENTS

| | | | |
|---|---|---|---|
| 3,231,089 A | * | 1/1966 | Thornton |
| 3,543,935 A | * | 12/1970 | Detrick ........................ 210/130 |
| 3,567,023 A | * | 3/1971 | Buckman et al. ........... 210/130 |
| 3,594,012 A | * | 7/1971 | Whittaker et al. |
| 4,014,556 A | * | 3/1977 | Anderson |
| 4,103,901 A | * | 8/1978 | Ditcher |
| 4,108,446 A | * | 8/1978 | Lloyd |
| 4,298,206 A | * | 11/1981 | Kojima |
| 4,371,177 A | * | 2/1983 | Bahr et al. |
| 4,437,986 A | * | 3/1984 | Hutchins et al. ............ 210/130 |
| 4,510,664 A | * | 4/1985 | Lock |
| 4,582,330 A | * | 4/1986 | Lew et al. |
| 4,690,414 A | * | 9/1987 | Haaland |
| 4,732,671 A | * | 3/1988 | Thornton et al. ............. 210/86 |
| 4,834,885 A | * | 5/1989 | Misgen ....................... 210/440 |
| 4,991,858 A | * | 2/1991 | Abila et al. |
| 5,094,745 A | | 3/1992 | Reynolds |
| 5,236,579 A | * | 8/1993 | Janik et al. .................... 210/94 |
| 5,447,627 A | * | 9/1995 | Loafman et al. ............ 210/316 |
| 5,454,573 A | * | 10/1995 | Nijland |
| 5,906,740 A | * | 5/1999 | Brown et al. ............... 210/450 |
| 5,944,323 A | * | 8/1999 | Cavka |
| 5,985,144 A | * | 11/1999 | Janik et al. ................. 210/233 |
| 6,126,823 A | * | 10/2000 | Soderlund et al. .......... 210/206 |
| 6,237,628 B1 | * | 5/2001 | Miller et al. |
| 6,350,379 B1 | * | 2/2002 | Roll et al. ................ 210/323.2 |

OTHER PUBLICATIONS

Hawley's Condensed Chemical Dictionary (Lewis, Richard J. Sr., 13th Ed. P. 904).*

* cited by examiner

Primary Examiner—Matthew O. Savage
Assistant Examiner—Marianne Ocampo

(57) ABSTRACT

An improved sealing grommet for a spin-on type fluid filter has an annular flange coupled to an interior wall of the grommet body which sealingly engages filter adapter standpipes of varying diameters. An annular cavity, formed by the interior wall of the grommet body and the annular flange, allows pressurized fluid within the annular cavity to exert forces against the surface of the cavity to thereby enhance the sealing engagement between the filter element, the base plate and the filter adapter standpipe.

8 Claims, 1 Drawing Sheet

UNIVERSAL GROMMET SEAL FOR SPIN-ON TYPE FILTERS

BACKGROUND OF THE INVENTION

1. Technical Field

The present invention relates generally to spin-on type fluid filters, and more particularly, to a sealing grommet for use in a spin-on type filter.

2. Discussion

The use of sealing grommets in spin-on type filters is well known in the art and may be seen by reference to commonly owned U.S. Pat. No. 5,094,745. Despite the widespread commercial use of such sealing grommets, the prior art sealing grommets are none the less susceptible to improvement.

For example, in many applications it is desirable for the sealing grommet to be received into sealing engagement over a filter adapter standpipe. Due to dimensional variations between the design of the various standpipes, it is frequently necessary to supply a family of spin-on type filters which are identical except for the use of several differently dimensioned sealing grommets. The use of multiple sealing grommets in otherwise similar filters poses several distinct disadvantages. Initially, tooling costs to mold the sealing grommet are substantially increased due to the fact that several molds must be produced. The proliferation of grommet designs substantially increases the risk that the wrong sealing grommet will be used in a filter assembly. Such assembly defects are often not readily discernable due to their similar design and frequently small dimensional differences. The use of multiple sealing grommets also negatively impacts the cost of the filter. Filters which are unique to specific applications due to the size of their sealing grommet are frequently manufactured on low-volume production equipment which is less efficient than the equipment utilized for high-volume filter production. As such, the cost of these grommet-specific filters is negatively impacted by set-up costs as the costs associated with changing over production equipment to fabricate the low-volume filters are amortized over a smaller population of filters as compared to similar high-volume filters. Another consequence of low volume filters is the tendency for the inventory of grommet-specific filters to be consumed at a slower rate, thereby increasing inventory costs relative to the inventory costs for similar high-volume filters. Consequently, there remains a need in the art to produce a sealing grommet for use in a spin-on type fluid filter which can universally adapt to a range of standpipe dimensions.

SUMMARY OF THE INVENTION

It is therefore a general object of the present invention to provide a sealing grommet which can sealingly engage standpipes of varying diameters.

It is a more specific object of the present invention to provide a sealing grommet which includes an angled, interior annular flange which sealingly engages a standpipe.

The improved sealing grommet of the present invention includes a generally hollow body portion and an annular flange coupled to an interior wall of the grommet body. The annular flange is configured to sealingly engage the standpipe of a filter adapter. The annular flange depends away from one of the ends of the grommet so as to sealingly engage standpipes of varying diameters. An annular cavity, formed by the interior wall of the grommet body and the annular flange, allows pressurized fluid within the annular cavity to exert forces against the surface of the cavity to thereby enhance the sealing engagement between the filter element, the base plate and the filter adapter standpipe.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
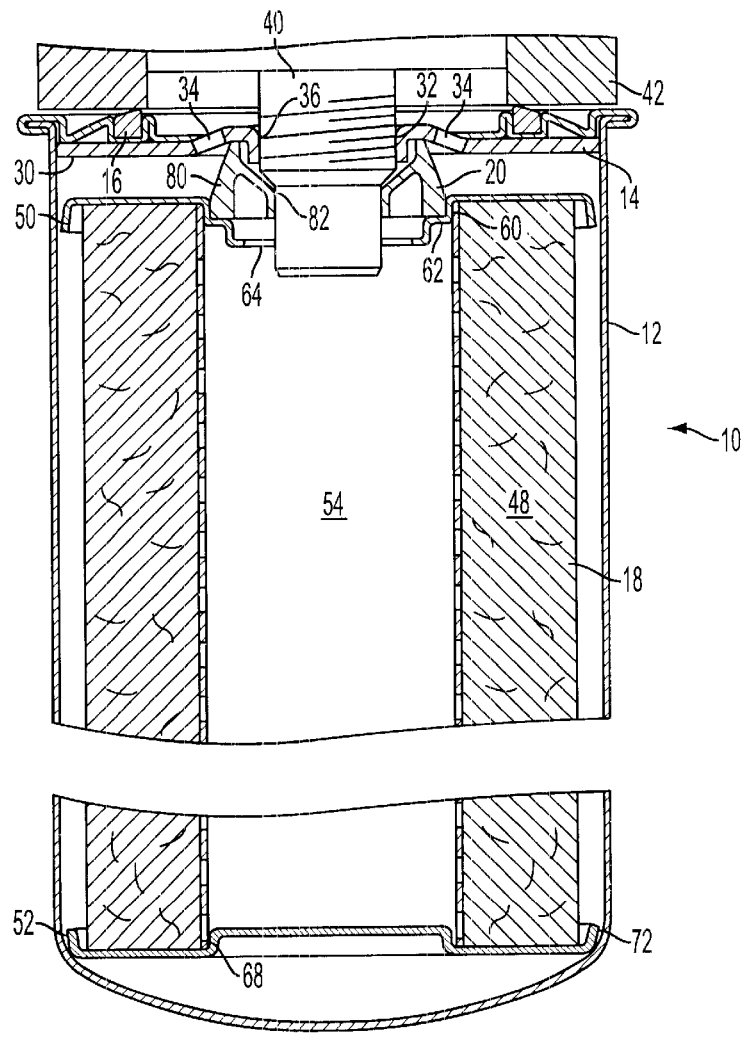
FIG. 1 is a sectional view of an exemplary spin-on type filter constructed in accordance with the preferred embodiment of the present invention.

Referring to FIG. 1 of the drawings, a "spin-on" type filter assembly constructed in accordance with the preferred embodiment of the present invention is generally indicated by reference numeral 10. Filter assembly 10 is shown to include a housing 12, a base plate 14, an external seal 16, a filter element 18 and sealing grommet 20. Housing 12 is shaped in the form of a cylindrical cup having an open end 30 closed by base plate 14 which is fixedly secured to housing 12 through a conventional closure means, such as roll crimping. Base plate 14 is an annular disc formed from a sheet metal and includes a center port 32 and a plurality of fluid inlet apertures 34 which are spaced around center port 32. Center port 32 includes internal threads 36 which are sized to threadably engage a standpipe 40 and allow filter assembly 10 to be removably coupled to a filter adapter 42. Filter element 18 includes a filter media 48, first and second filter media supports 50 and 52, and a central hollow chamber 54. First filter media support 50 is disc-shaped and includes a raised outer edge 60, a radial ledge 62 and a fluid exit aperture 64. Second filter media support 52 is also disc-shaped and includes a raised outer edge 68 and a radial ledge 70. Filter media 48 is secured to first and second filter media supports 50 and 52 and confined radially between raised outer edges 60 and 68. Filter element 18 is disposed within filter assembly 10 between housing 12 and base plate 14. The edge 72 of second filter media support 52 is formed to contact housing 12.

Figure 2:
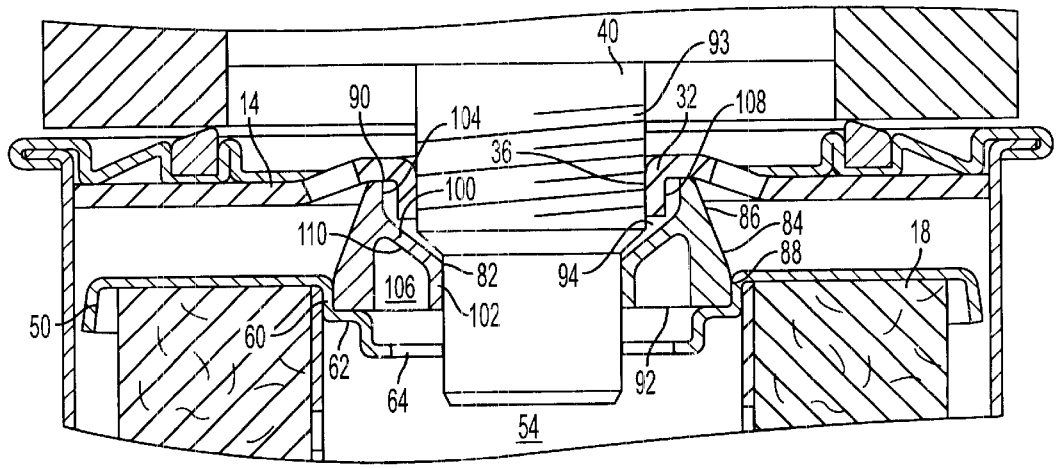
FIG. 2 is an enlarged view of a portion of the filter shown in FIG. 1.

Sealing grommet 20 is shown to include a body portion 80 and an annular flange 82. With additional reference to FIG. 2, body portion 80 is shown to include an exterior surface 84 having a conically shaped portion 86 and cylindrically shaped portion 88, a first end 90 having a first diameter, a second end 92 having a second diameter and a generally hollow interior 94. Annular flange 82 extends radially inward of body portion 80 and includes a first portion 100 and a second portion 102. First portion 100 is coupled to interior wall 104 and depends away from first end 90 at a first angle. Second portion 102 is coupled to the distal end of first portion 100 and depends away from first end 90 at a second angle. Interior wall 104 and annular flange 82 cooperate to form an annular cavity 106 proximate second end 92. Preferably, sealing grommet 20 is molded from a resilient, resinous material, such as polypropylene or rubber.

Sealing grommet 20 is disposed within filter assembly 10 between radial ledge 62 and base plate 14. Sealing grommet 20 is sized so that it is compressed a predetermined amount when base plate 14 is secured to housing 12. This causes sealing grommet 20 to exert a force against both base plate 14 and first filter media support 50 which ensures proper alignment of filter element 18 to housing 12. The force exerted against first filter media support 50 also ensures that edge 72 remains in contact with housing 12.

A portion of interior wall 104 proximate first end 90 surrounds the outer surface 108 of center port 32 and provides sealing capabilities which prevents contaminated fluid flowing into filter assembly 10 through fluid inlet apertures 34 from commingling with filtered fluid flowing through central hollow chamber 54 into standpipe 40. Cylindrically shaped portion 88 is sized to sealingly radial ledge 62 so as to also prevent contaminated fluid from flowing into central hollow chamber 54 and commingling with filtered fluid. Annular flange 82 sealingly engages standpipe 40 and thereby prevents contaminated fluid within filter adapter 42 from flowing between the threaded portion 93 of standpipe 40 and internal threads 36. Due to the resilient characteristic of sealing grommet 20 and the angular configuration of first and second portions 100 and 102, annular flange 82 is operable for sealingly engaging standpipes 40 of varying diameters within a predetermined range.

The sealing capabilities of sealing grommet 20 are further enhanced by annular cavity 106. The pressure of the fluid in annular cavity 106 acts along the entire surface 110 of annular cavity 106, producing forces which act in, a normal direction along surface 110. These forces cause body portion 80 to be further forced against base plate 14 and first filter media support 50, thereby improving the sealing effect between grommet 20 and these elements. These normal forces are also operable for further forcing annular flange 82 against standpipe 40 to thereby improve the sealing effect between grommet 20 and standpipe 40.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A fluid filter assembly comprising:
   a base portion having a center port, said center port adapted to threadably engage a filter adapter standpipe;
   a filter element; and
   a grommet having a body portion and an annular flange, said body portion including an exterior surface having a conically shaped portion and a cylindrically shaped portion, a first end adjacent said conically shaped portion, a second end adjacent said cylindrically shaped portion, and a generally hollow interior, said annular flange coupled to an interior wall of said body portion, said annular flange extending radially inward of said body portion at an angle such that it depends away from said base portion and into a space defined by a longitudinal projection of said base portion center port so as to sealingly engage said filter adapter standpipe, said body portion and annular flange cooperating to form an annular interior cavity therebetween adjacent said second end; said first end sealingly engaging said base portion, and said second end sealingly engaging said filter element.

2. The fluid filter assembly of claim 1 wherein said sealing grommet is made of a resilient resinous material.

3. The fluid filter assembly of claim 2 wherein said resilient resinous material is polypropylene.

4. The fluid filter assembly of claim 2 wherein said resilient resinous material is rubber.

5. The fluid filter assembly of claim 1 wherein said interior cavity is subjected to pressure from fluid in the filter assembly so as to exert a force directing said body portion against said filter element and thereby improving the sealing engagement therebetween.

6. The fluid filter assembly of claim 1 wherein said interior cavity is subjected to pressure from fluid in the filter assembly so as to exert a force directing said body portion against said base portion and thereby improving the sealing engagement therebetween.

7. The fluid filter assembly of claim 1 wherein said interior cavity is subjected to pressure from fluid in the filter assembly so as to exert a force directing said annular flange against said standpipe and thereby improving the sealing engagement therebetween.

8. The fluid filter assembly of claim 1 wherein said annular flange includes a first portion coupled to said body portion and depending away from said base portion at a first angle and a second portion coupled to a distal end of said first portion and depending away from said base portion at a second angle.

* * * * *